US012263436B2

(12) United States Patent
Chan et al.

(10) Patent No.: US 12,263,436 B2
(45) Date of Patent: Apr. 1, 2025

(54) FAST-TRACK NEGATIVE PRESSURE ISOLATION SYSTEM FOR RESPIRATORY INFECTIOUS DISEASE CONTROL

(71) Applicant: City University of Hong Kong, Hong Kong (HK)

(72) Inventors: Chak Keung Chan, Hong Kong (HK); Zuankai Wang, Hong Kong (HK); Steven Wang, Hong Kong (HK); Wei Deng, Hong Kong (HK); Chen Ling, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 356 days.

(21) Appl. No.: 17/826,134

(22) Filed: May 26, 2022

(65) Prior Publication Data

US 2023/0011256 A1    Jan. 12, 2023

Related U.S. Application Data

(60) Provisional application No. 63/218,512, filed on Jul. 6, 2021.

(51) Int. Cl.
| | |
|---|---|
| *B01D 46/00* | (2022.01) |
| *A61G 10/00* | (2006.01) |
| *A61G 10/02* | (2006.01) |
| *B01D 46/10* | (2006.01) |
| *B01D 46/54* | (2006.01) |
| *F24F 3/163* | (2021.01) |

(52) U.S. Cl.
CPC ......... *B01D 46/10* (2013.01); *B01D 46/0028* (2013.01); *B01D 46/54* (2013.01)

(58) Field of Classification Search
CPC .... B01D 46/10; B01D 46/0028; B01D 46/54; F24F 3/163; A61G 10/005; A61G 10/023
USPC .............. 55/385.1, 385.2, DIG. 29; 424/187; 600/21; 128/205.26
See application file for complete search history.

(56) References Cited

U.S. PATENT DOCUMENTS

| | | | |
|---|---|---|---|
| 3,306,289 A * | 2/1967 | Cameto ................. | A61G 10/02 128/200.14 |
| 11,077,005 B1 * | 8/2021 | Economopoulos .... | A61B 46/40 |
| 2015/0082757 A1 * | 3/2015 | Chaen ................ | B01D 46/0001 55/482 |
| 2015/0107203 A1 * | 4/2015 | Ichikawa ............ | D06M 13/355 55/497 |
| 2021/0322242 A1 * | 10/2021 | Hogan ................. | A61G 10/023 |
| 2021/0322243 A1 * | 10/2021 | Hamilton ............. | A61G 10/023 |

(Continued)

*Primary Examiner* — Minh Chau T Pham
(74) *Attorney, Agent, or Firm* — Idea Intellectual Limited; Margaret A. Burke; Sam T. Yip

(57) ABSTRACT

The present invention provides a vented individual negative pressure enclosure system for extracting potentially contaminated air from an individual. The system includes an adjustable assemblable and disassemblable frame structure configured to surround a bed, chair, or toilet. A vapor-impermeable sheet extends over the frame structure. An air purification system communicates with a plurality of extraction vents positioned on or in the frame structure. The air purification system may be a water-filtration-based air purification system including a particle growth tube for increasing the size of aerosol droplets to facilitate capture. The air purification system includes a pump and HEPA filter and, optionally, a UV sterilizer.

7 Claims, 22 Drawing Sheets

(56) References Cited

U.S. PATENT DOCUMENTS

2022/0339050 A1* 10/2022 Ball .......................... A47K 3/38
2022/0370274 A1* 11/2022 Park ......................... E04H 3/08

* cited by examiner

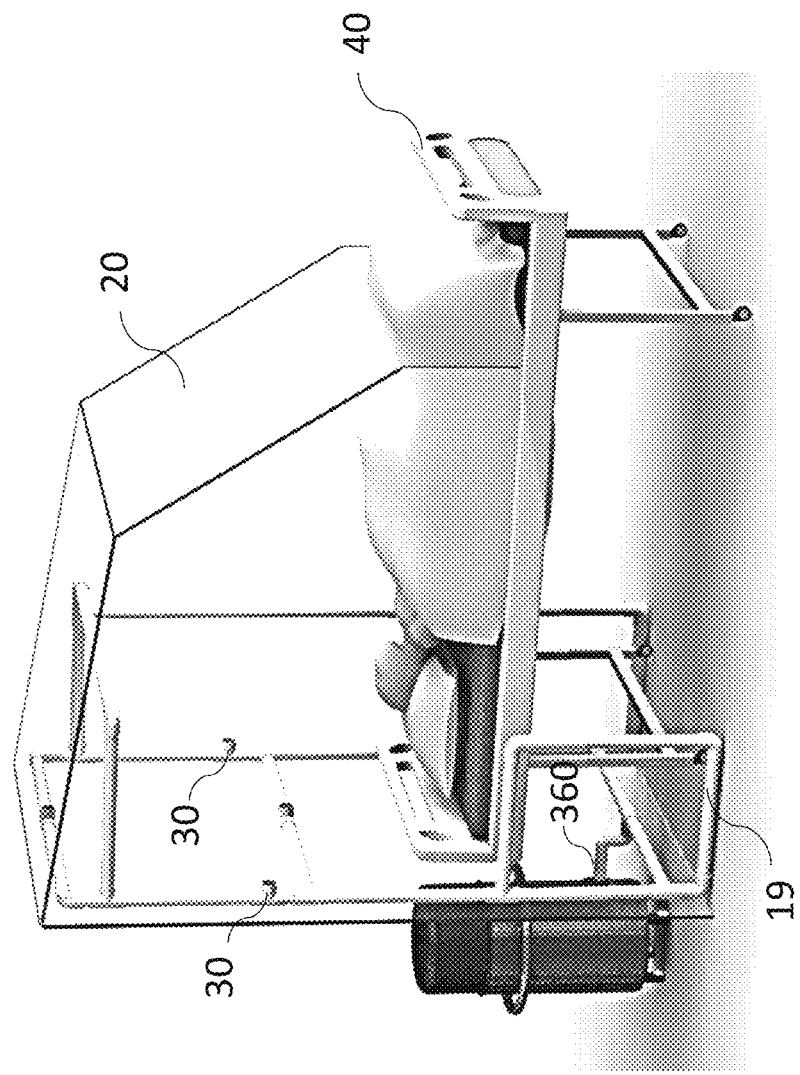

FAST-TRACK NEGATIVE PRESSURE ISOLATION SYSTEM FOR RESPIRATORY INFECTIOUS DISEASE CONTROL

FIELD OF THE INVENTION

The present invention relates to isolation systems in general and, more particularly, to individual isolation systems with ventilation for respiratory infections disease control.

BACKGROUND

The Coronavirus Disease 2019 (COVID-19) is a global emergency. Up until June 2021, over 175 million worldwide cases were reported, over 34 million of which were in the US. By March 2022, over 482 million cases were reported and over 6 million deaths. COVID-19 is highly infectious as the virus, SARS-COV-2, transmits through direct or indirect human-to-human contact, fomite, and respiratory droplets (FIG. 1A).

COVID-19 overwhelmed the healthcare/medical systems in more than 100 countries. In these severe scenarios, patients are treated in hospitals corridors, general wards, and temporary isolation rooms, and in makeshift hospitals, which puts both the patients and the healthcare workers at great risk. An ultra-high concentration of droplets (virus hosts) appears in the breathing zone and the virus can remain viable and infectious in aerosols for many hours; furthermore, non-invasive ventilation and exhaled air dispersion pose a great risk of infection for medical workers/patients in hospitals.

Moreover, toilets pose a great risk for spreading the Coronavirus Disease. SARS-CoV-2 viruses were also reported to be found in stool specimens. A toilet flush can generate a polluted flow with up to ~80,000 tiny water droplets as well as airborne pathogens (FIG. 1B). Therefore, urgent strategies for cleaning the air in hospital/public toilets are needed to minimize the cross-infection risk. The present invention targets this particular issue.

In addition, the restriction policies in more than 100 countries along with confusion/fear among the public on cross-infection in airplanes had led to a suspension of international flights which in turn destroys the international aviation industry.

In order to solve the above problems, the present invention provides an effective and versatile approach through 'negative pressure individual enclosures' for confirmed/suspected COVID-19 or other respiratory infectious disease patients and/or other healthy individuals. The fast-track approach for the enclosure of the present invention may be implemented with minimal engineering changes and readily installed in hospitals wards, ICU, hospital waiting rooms, clinics, toilets, planes, trains and buses. That is, the present invention provides an application-based technology emphasizing on the use of a novel portable vented system to tackle a respiratory infectious disease crisis. The invention effectively removes harmful droplets or aerosols to minimize the cross-infection risk, in order:
1. to protect the medical workers/patients,
2. to protect individuals in different locations with limited/special ventilations (e.g., airplanes, public toilets),
3. to isolate/protect suspected respiratory infectious disease individuals.

SUMMARY OF THE INVENTION

The negative pressure isolation system of the present invention provides a fast track and safe solution for accommodating potential/suspected/confirmed COVID-19 or other respiratory infectious disease patients and healthy individuals. The system successfully allows infected individuals and workers to avoid the risk of cross-infection in several important venues including: (1) Hospitals, in wards, ICU and waiting rooms; (2) airplanes; (3) trains; (4) toilets; (5) clinics/aging centres/health centres; (6) airports; (7) isolation centres; (8) makeshift hospitals. Using a multidisciplinary and synergetic approach, the ultimate objective of the present invention realizes a platform technology for COVID-19 and respiratory infectious diseases control.

In one aspect the present invention provides a vented individual negative pressure enclosure system for extracting potentially contaminated air from an individual. The system includes an adjustable assemblable and disassemblable frame structure configured to surround a bed, chair, or toilet. A vapor-impermeable sheet extends over the frame structure. An air purification system communicates with a plurality of extraction vents positioned on or in the frame structure. The air purification system may be a water-filtration-based air purification system including a particle growth tube for increasing the size of aerosol droplets to facilitate capture. The air purification system includes a pump and HEPA filter and, optionally, a UV sterilizer.

BRIEF DESCRIPTION OF THE DRAWINGS

FIGS. 2A-2E depict various parts and configurations of fast-track isolation systems for respiratory infectious disease control.

FIG. 6A shows a water-based filtration system and FIG. 6B shows its use with an isolation structure.

FIG. 10A shows prototype operation; FIG. 10B: demonstrates negative pressure being created; FIG. 10C shows that almost 100% aerosols can be removed when a HEPA pump is turned on (87ACH is achieved); FIG. 10D show the aerosol removal efficiencies under different scenarios (exhaling, talking and coughing).

DETAILED DESCRIPTION

The inventive negative pressure enclosures remove harmful droplets or aerosols from the air in order to minimize cross-infection risk by limiting the spread of the virus and decrease the encounters between suspected/confirmed COVID-19/other respiratory infectious disease patients and healthcare workers and/or other healthy individuals. The fast-track negative pressure enclosure system includes an adjustable frame, a filtration unit, and a transparent enclosure. Through integrating the components according to the invention, the fast-track enclosure can be easily installed/implemented in hospital waiting rooms/isolation centres to house the suspected COVID-19/other respiratory infectious disease patients. FIG. 2 illustrates one embodiment of the present invention to limit the spread of the virus and decrease encounters between patients with COVID-19 and healthcare workers or other healthy individuals. A combined approach (experimental, computational and theoretical) is used to determine the optimized enclosure system design to host COVID-19 suspected/confirmed patients.

Enclosure System Overview

Figure 1A:
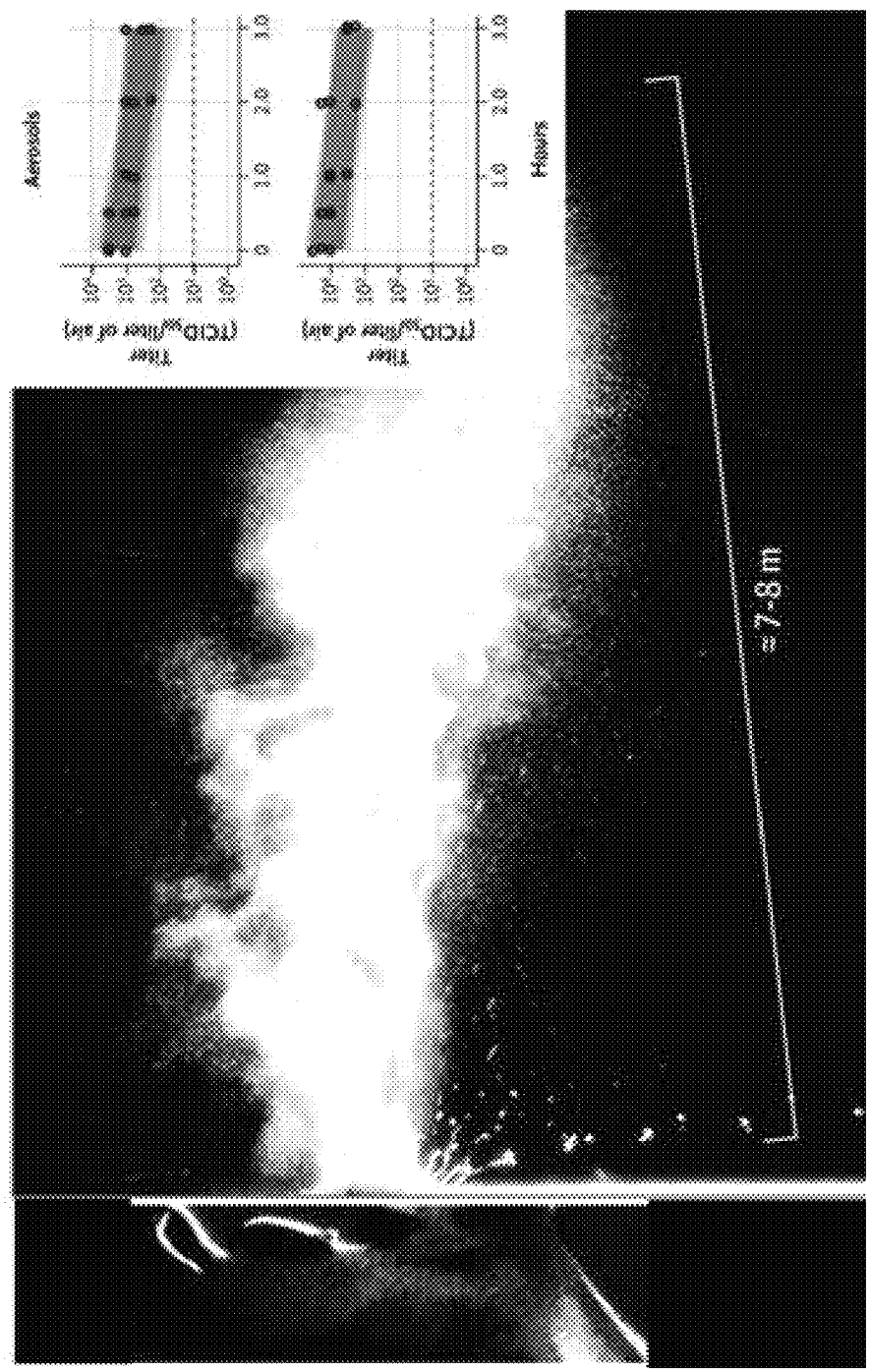
FIG. 1A depicts ultra-long distance gas emission in a turbulent gas cloud (virus carriers) from a human sneeze. Insert: SARS-COV-2 remains viable in air for three hours.
Figure 1B:
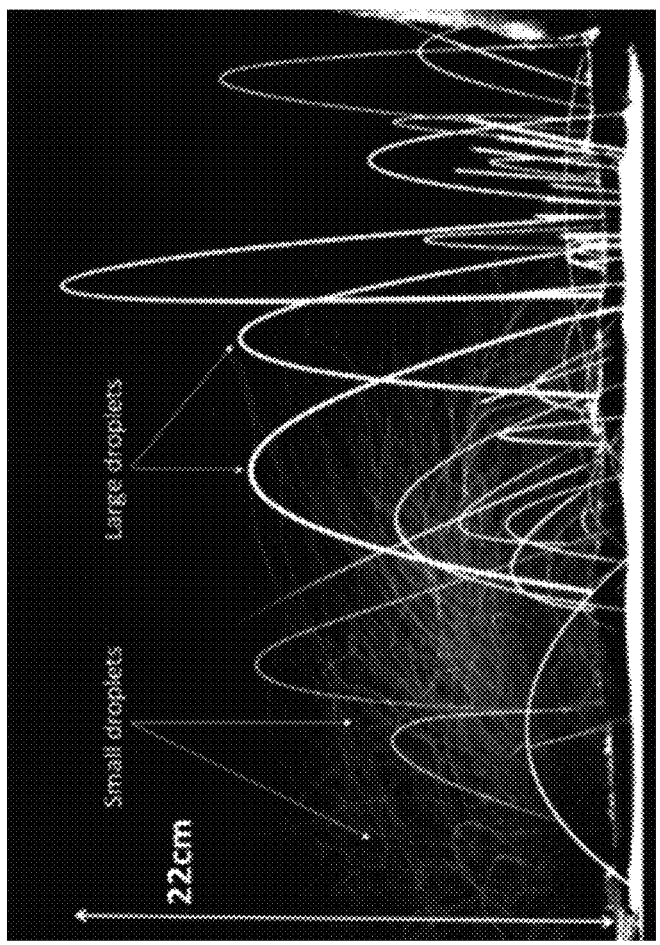
FIG. 1B depicts large/small droplet trajectories above a toilet bowl after a flush.
Figure 2A:
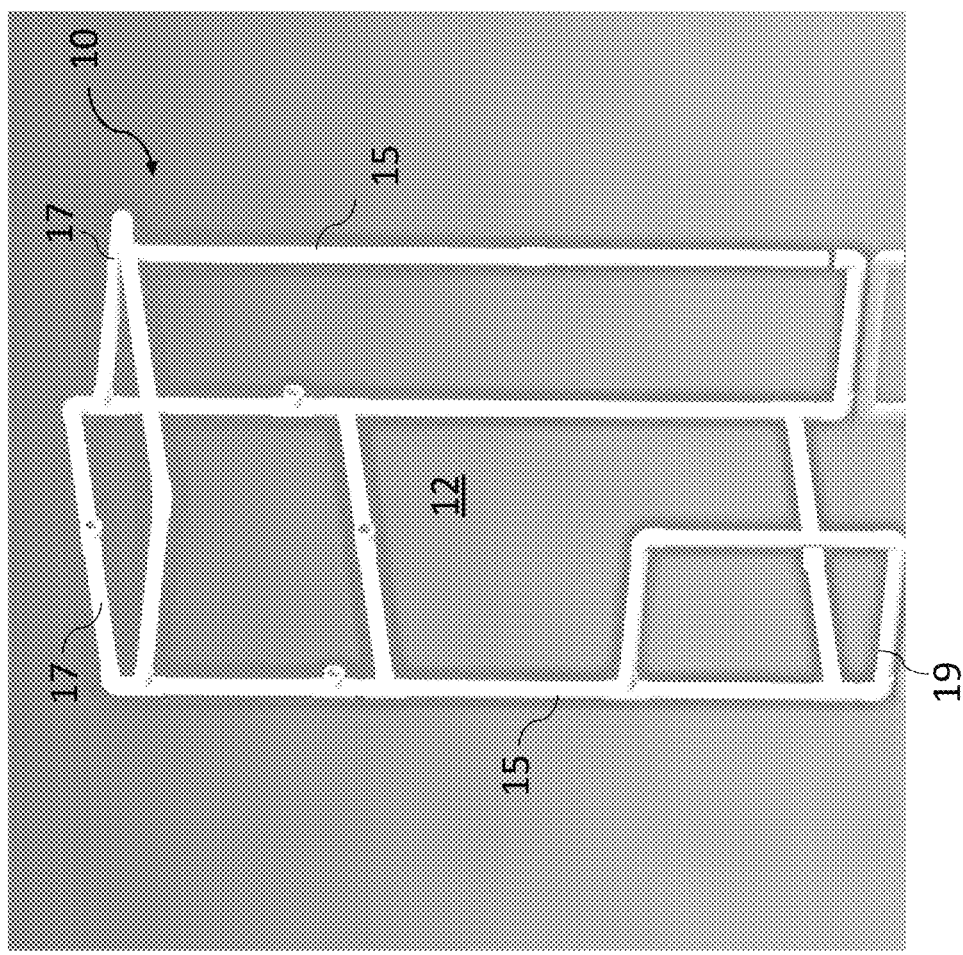
Figure 2B:
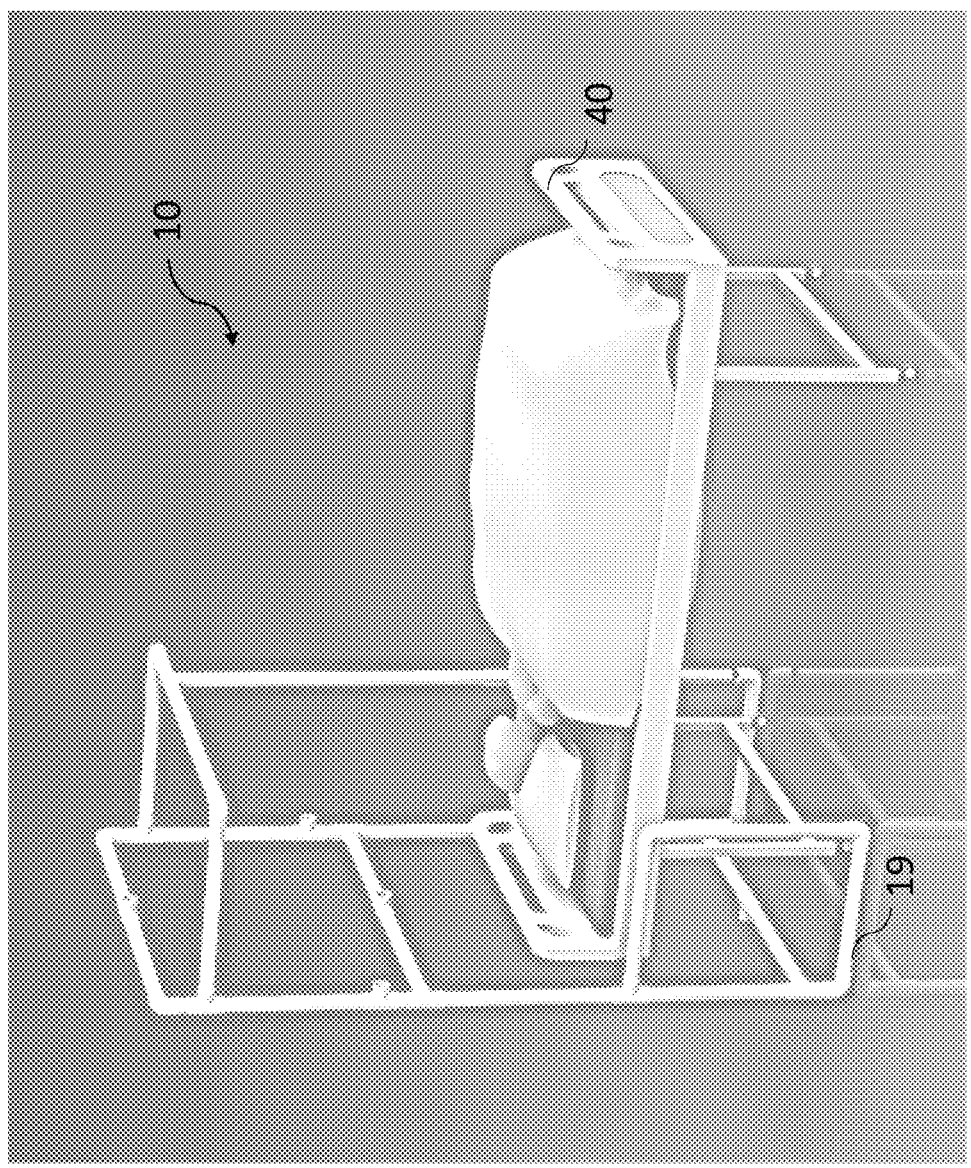
Figure 2C:
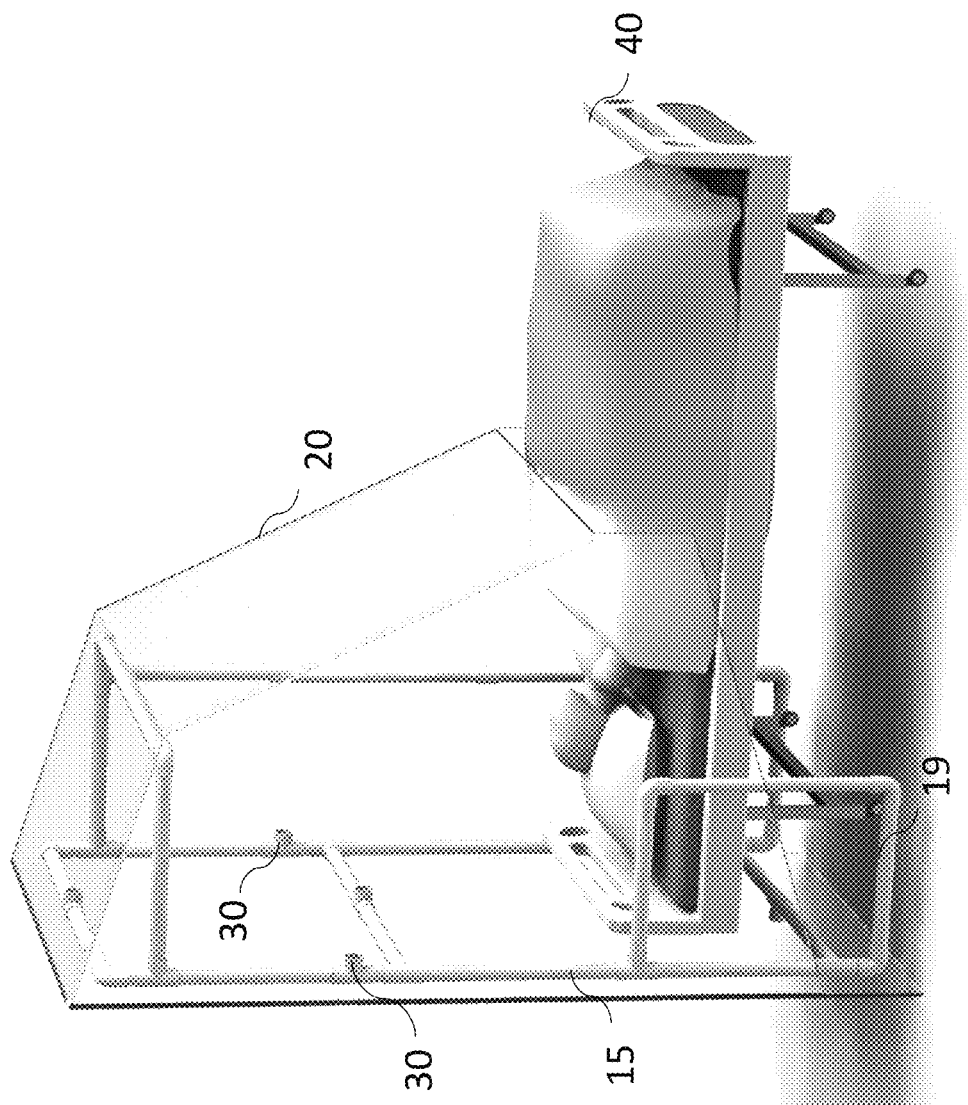
Figure 2E:
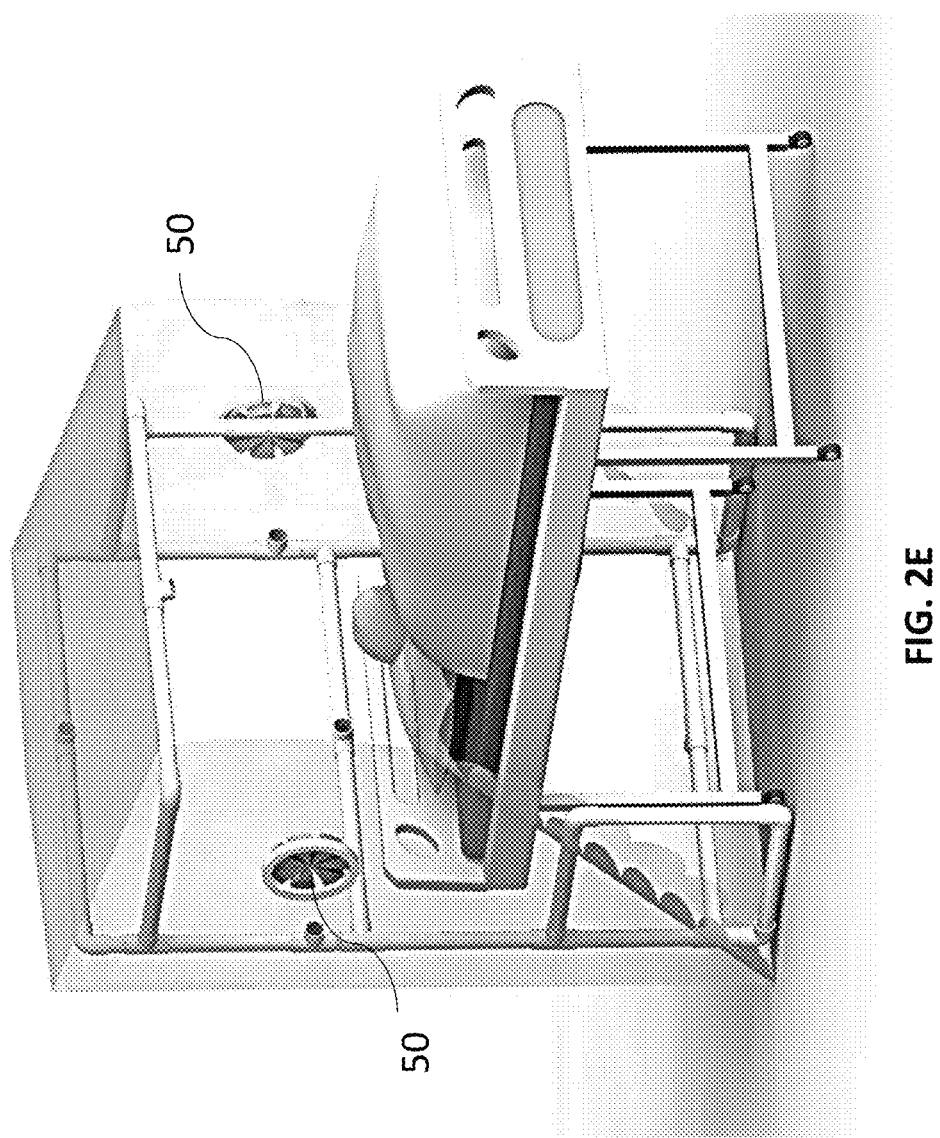

FIGS. 2A-2E depict a freestanding enclosure 10 including adjustable frame 12 that is configured to support a flexible transparent polymeric sheet 20. Adjustable frame 12 includes plural vertical supports 15 interconnected to plural horizontal supports 17. In FIG. 2E, patient access ports 50 are provided so that medical workers can provide treatment and food and water to the patient. In an embodiment, the adjustable frame 12 may include hollow tubes, such as polyvinyl chloride (PVC) tubes; these tubes may include plural vapor extraction ports 30 positioned in the tube for extracting air from the enclosure, creating a negative pressure enclosure for protecting medical workers from suspected infected individuals. In order to reduce the amount of air to be extracted, the enclosure 10 is configured to enclose a region that includes only the patient's head and upper torso. In this manner, the filtration units may be made smaller and portable, allowing the enclosures to be deployed not only in hospitals but also in community isolation centers, airports, transportation hubs, etc. where suspected infected individuals need to be separated in a safe environment.

The length of vertical supports 15 is selected to create a desired height for the enclosure. Typically, the enclosure should be sufficiently tall so that the patient can sit up in bed 40 and wide enough so that side supports 19 can clear the width of bed 40. As will be discussed in further detail below, a kit with varying support lengths can be provided such that the person assembling the portable enclosure can select the appropriately-sized supports to construct the enclosure of the desired size.

Figure 3A:
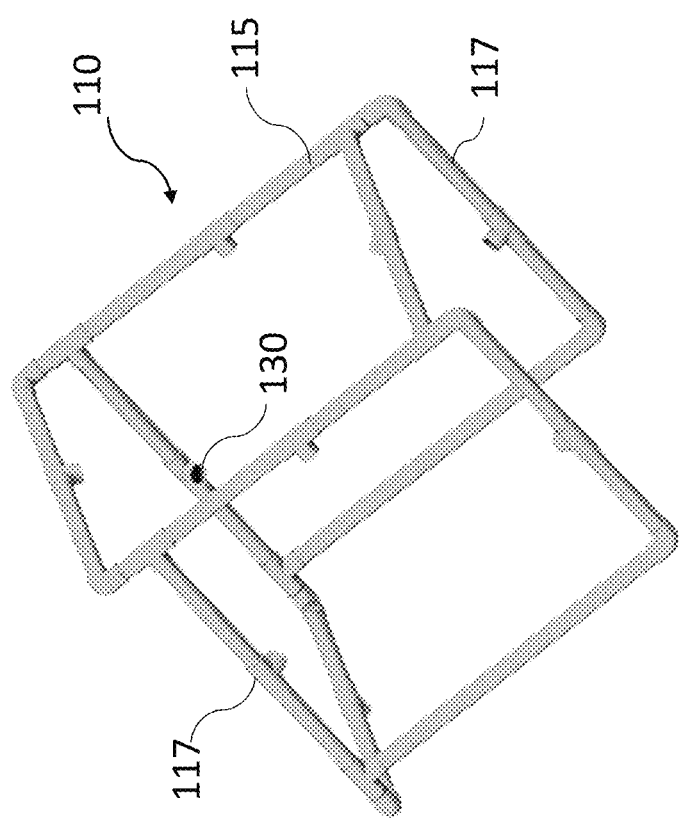
FIGS. 3A-3B depict vented isolation systems.
Figure 3B:
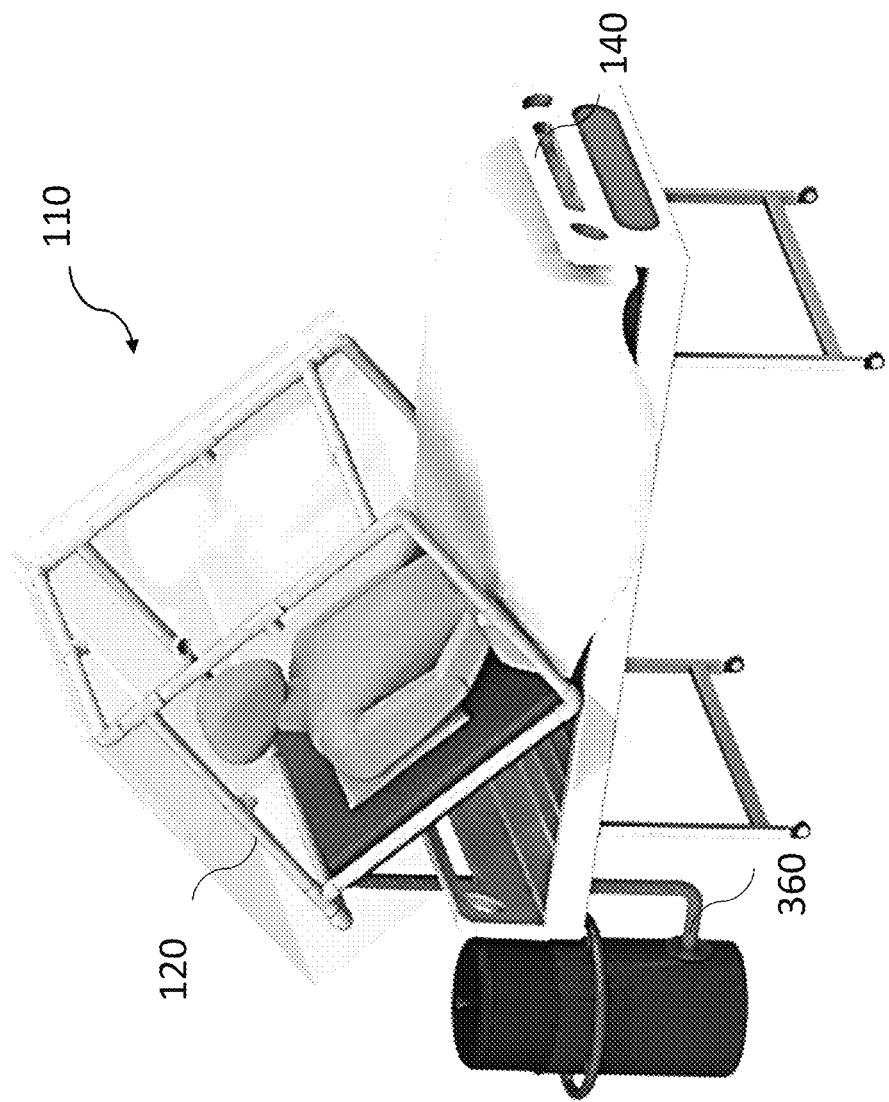

FIGS. 3A-3B show an alternative embodiment of the enclosure 110 that is supported by bed 140; the enclosure 110 further minimizes the amount of air/vapor that needs to be extracted from the enclosure. In enclosure 110, horizontal supports 117 rest on a mattress of bed 140 or on another portion of the bed. When the bed 140 is adjustable as seen in FIG. 3B, the enclosure, being supported on the bed, moves with the bed and follows the patient.

Figure 4C:
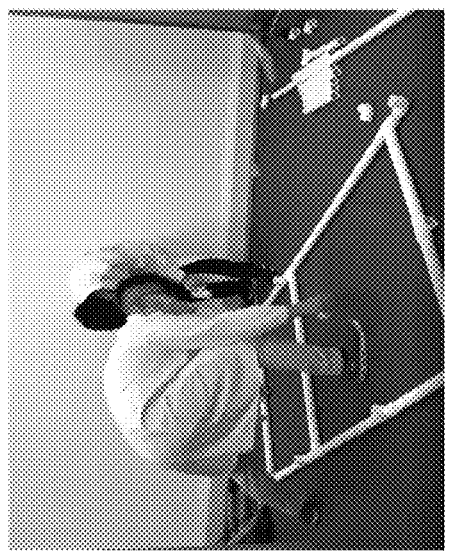
FIGS. 4A-4F are excerpts from a video depicting assembly of the fast-track isolation systems of the present invention by inexperienced assemblers demonstrating assembly in less than 5 minutes.
Figure 4F:
Figure 4B:
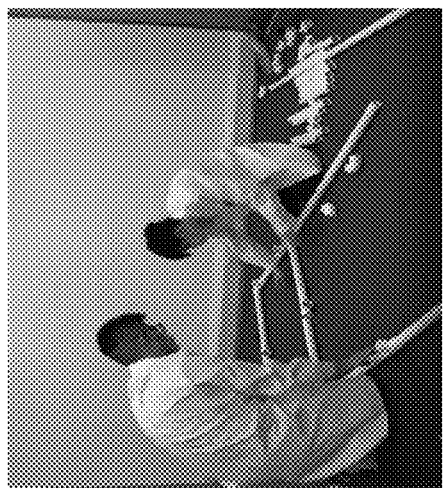
Figure 4E:
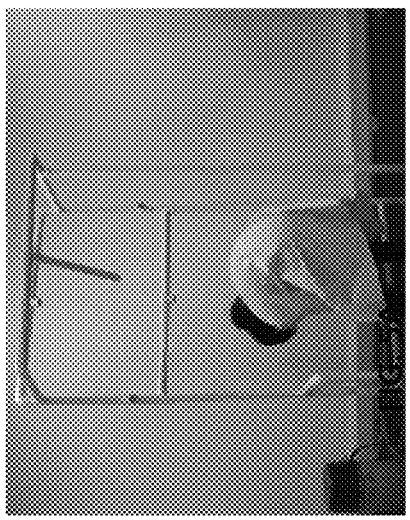
Figure 4A:
Figure 4D:
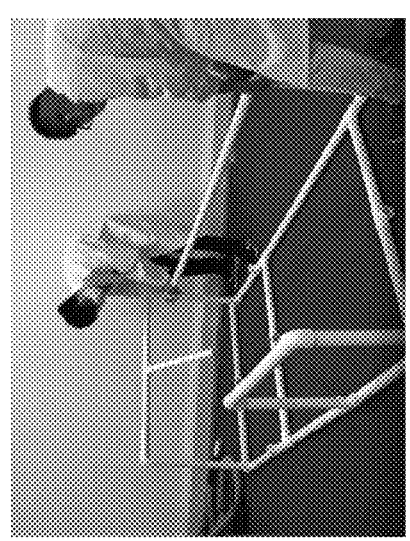

As depicted in FIGS. 4A-4E, the enclosures of the present invention can be set up quickly to deal with emergencies-two inexperienced assemblers (under instruction) can assemble the entire enclosure system within 5 minutes. As seen in FIG. 4A, horizontal support 17 is connected to a pair of vertical supports 15. A further horizontal support 17 is connected to further vertical supports 15 in FIG. 4B. In FIG. 4C, a complete section is assembled. In FIG. 4D, the base support 19 is assembled. In FIG. 4E, the frame portion 112 is completed. Finally, in FIG. 4F, the flexible polymeric sheet is positioned over the frame and the filter unit is attached to the enclosure.

System Components

Adjustable Frame

As described above, in on aspect, the adjustable frame may be constructed from polyvinyl chloride (PVC) materials including plumbing pipe, fittings and other small parts. PVC plumbing pipes and fittings are utilized for construction as all these materials are readily available. Further, these materials can be assembled through simple friction fitting without the need for fasteners or glue. However, it is understood that other easily-assembled framing materials such as metal bars and tubes and other polymeric tubes may also be used. The tube structure is not only used to transport air, but also for supporting the transparent polymeric sheet. Depending on different scenarios that accommodate slight air flow disruption, suction is completed by installing plural extraction ports 30, 130 (for example, 4 or more) on the PVC structure. In the embodiment of FIGS. 2 and 3, the outer diameter of the PVC tube is 40 mm and the inner diameter is 36 mm. Contaminated air ducting is conveyed through an exit port located at the rear of the enclosure. Cleaned air can be released back to the enclosure or released to outside of buildings or for further treatment.

Filtration Unit

Figure 5:
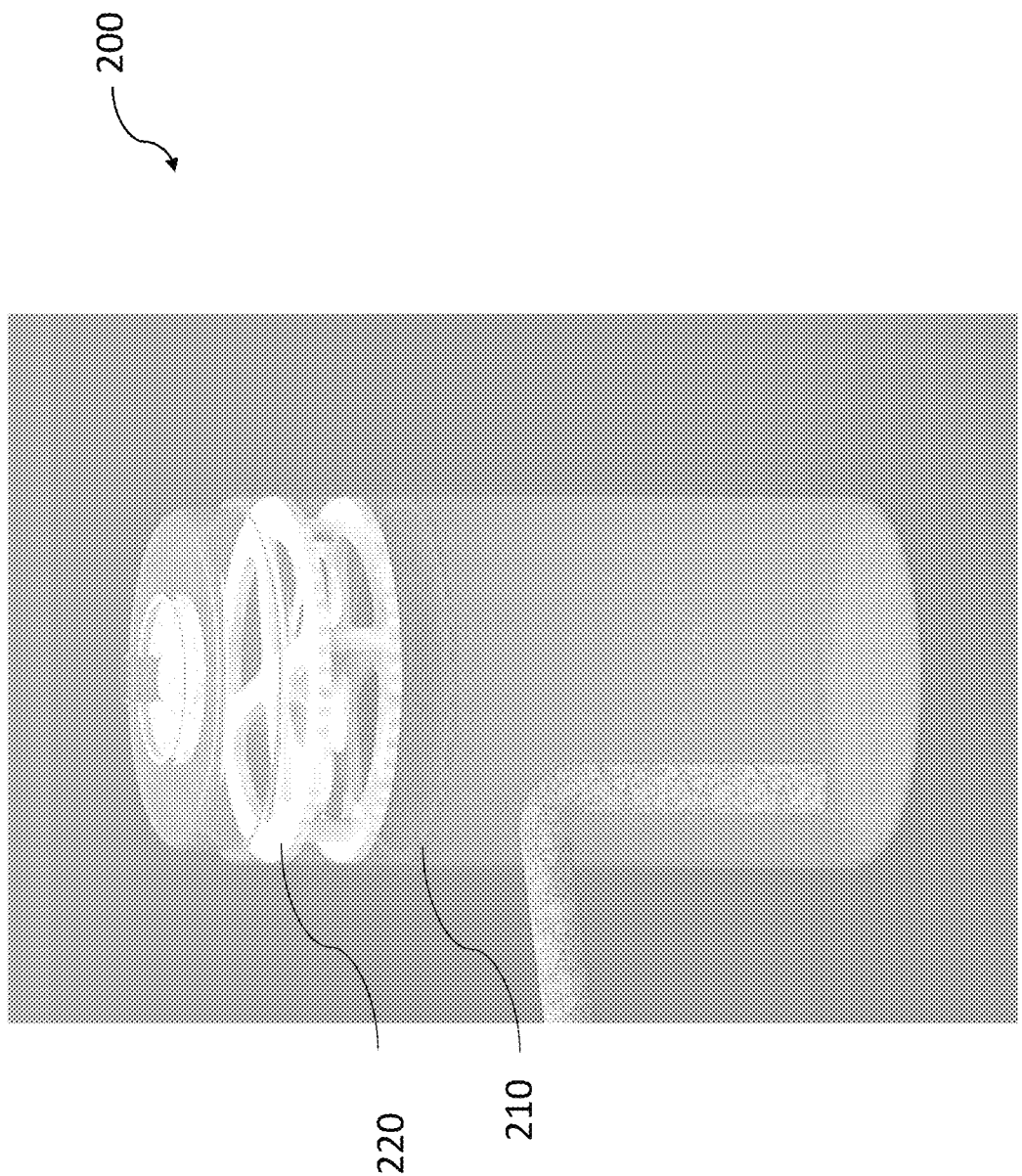
FIG. 5 depicts a ventilation system for isolation structures.

FIG. 5 depicts a filtration unit 200 cooperates with the enclosures 10, 110 to remove and purify contaminated air removed from the enclosure. The contaminated air containing COVID-19 (or other virus or bacteria-containing) droplets or aerosols are extracted and cleaned by using the filtration unit, which can be made up of two different subsystems:

High Efficiency Particulate Air (HEPA) Filter System 210

A HEPA filter system 210 includes a HEPA filter and a centralized or an individual pump 220. A HEPA filter is highly effective for collecting particulate matter of <1 µm at nearly 100% efficiency. It enables the capture of airborne viruses at nearly 100% efficiency. The HEPA filter 210 with pump 220 creates negative pressure in enclosure 10, 110 for extracting small quantities of fine dust and droplets. Filtration unit 200 has a light weight of approximately 12 kg, is portable, and is configured to use filter bags for easy cleaning. In addition, the filtration system 200 may be made of stainless steels so that it can be sterilized and is sturdy. Due to the large filtering surfaces, an industrial-level vacuum/filtration cleaner is formed. A filtration unit having a volume on the order of 15 L can produce a vacuum of 2900 mm $H_2O$ (~28439.29 Pa) and an air flow of 175 $m^3/h$ (~2917 L/min), so that it extracts contaminated droplets out of the enclosure quickly and efficiently.

Water Based Vacuum Air Filtration System

Figure 6A:
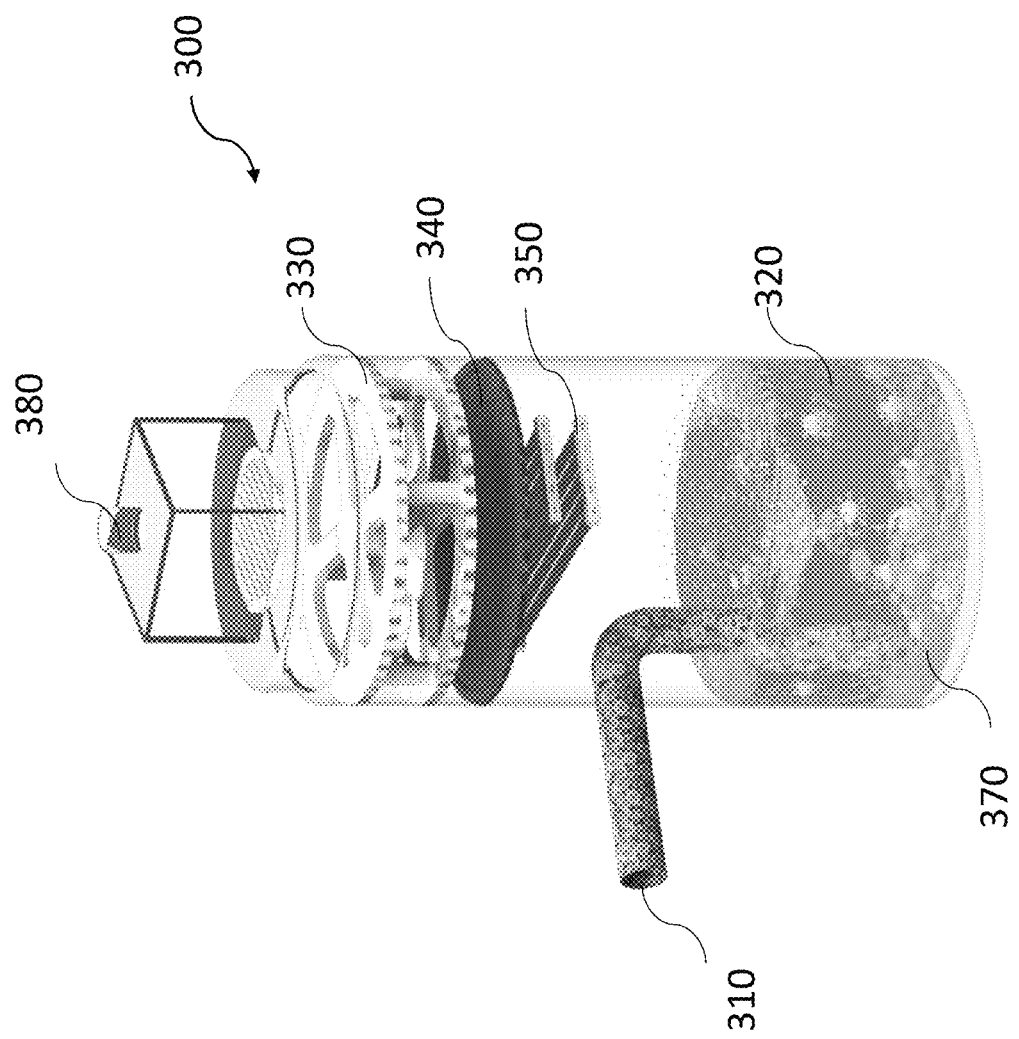
FIGS. 6A-6B depict ventilation systems for isolation structures.

Alternatively, the filtration unit may be a water based vacuum filtration unit 300 depicted in FIG. 6A. The water based vacuum filtration unit 300 includes a particle growth tube 310, a water based cleaner 320, a HEPA filter 340, a UVC sterilizer 350 and a centralized or an individual pump 330, as shown in FIG. 6A. The contaminated-air ducting is conveyed through extraction ports 30, 130, through manifold 360 located at the rear of the base of the enclosure. Extracted air is suctioned via pump 330, and is released back into circulation after cleaning. The aerodynamic studies ensure that no aerosolization takes place inside the enclosure under the optimized conditions.

The present invention uses an innovative technique to clean aerosols by enlarging the small aerosol particles through water condensation under a supersaturated environment (relative humidity >100%). The resultant enlarged particles can be effectively removed in the water filtration system. Continuous UVC disinfection of the aerosol-containing water takes place in the filtration system using UVC sterilizer 350 and the treated water after disinfection can be safely disposed to household/commercial drains. UVC irradiation has been found effective in disinfecting bacteria and viruses including COVID-19. It is advantageous over disinfection approaches that rely on application of chemicals. In one aspect, UVC irradiation at a wavelength of 254 nm irradiation is used to disinfect aerosols in the water filtration system of the present invention.

The filtration system of FIG. 6A draws ambient air through the manifold 360 at a high flow rate of 750~3000 L/min so that aerosols extracted from the enclosure can be removed and collected into the filtration system. Aerosols first pass through particle growth tube 310 to grow to a few microns in size via water condensation and then a water based cleaner 320 that aerodynamically and hydrodynamically captures the airborne particles through turbulent mixing with the incoming aerosol laden flow in an air tight basin 370.

To achieve high particle collection efficiency, turbulent mixing of the particle-laden air flow and water is required. This turbulent mixing is to promote collision of the particles and water surface, after which the particles will "stick" and be removed by the water-based cleaner in the system. The water-based air filtration system has a HEPA filter 340 before air exits the unit through exit port 380. Because most of the aerosols are already trapped in water, the HEPA filter will have an extended lifetime.

Transparent Flexible Polymer Sheet

Figure 4G:
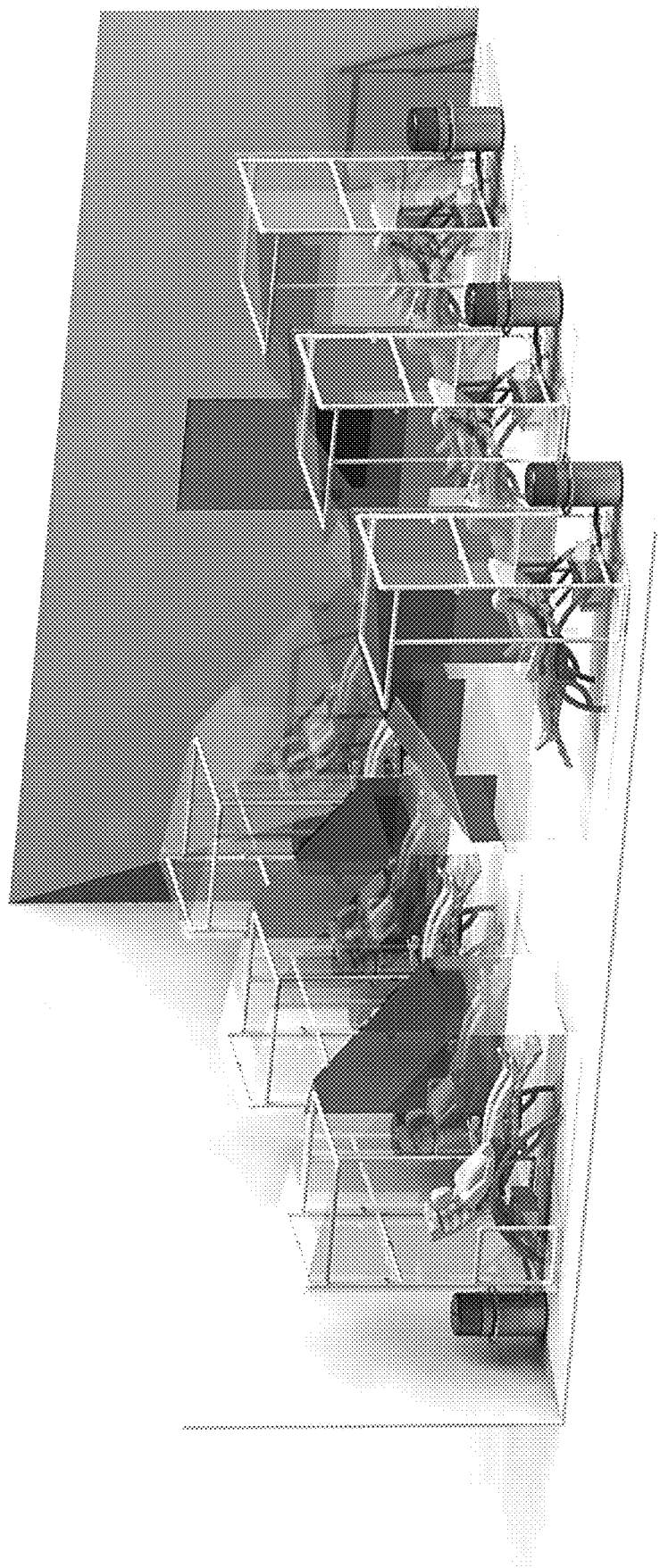
FIG. 4G shows a patient waiting area with a series of isolation systems.
Figure 6B:
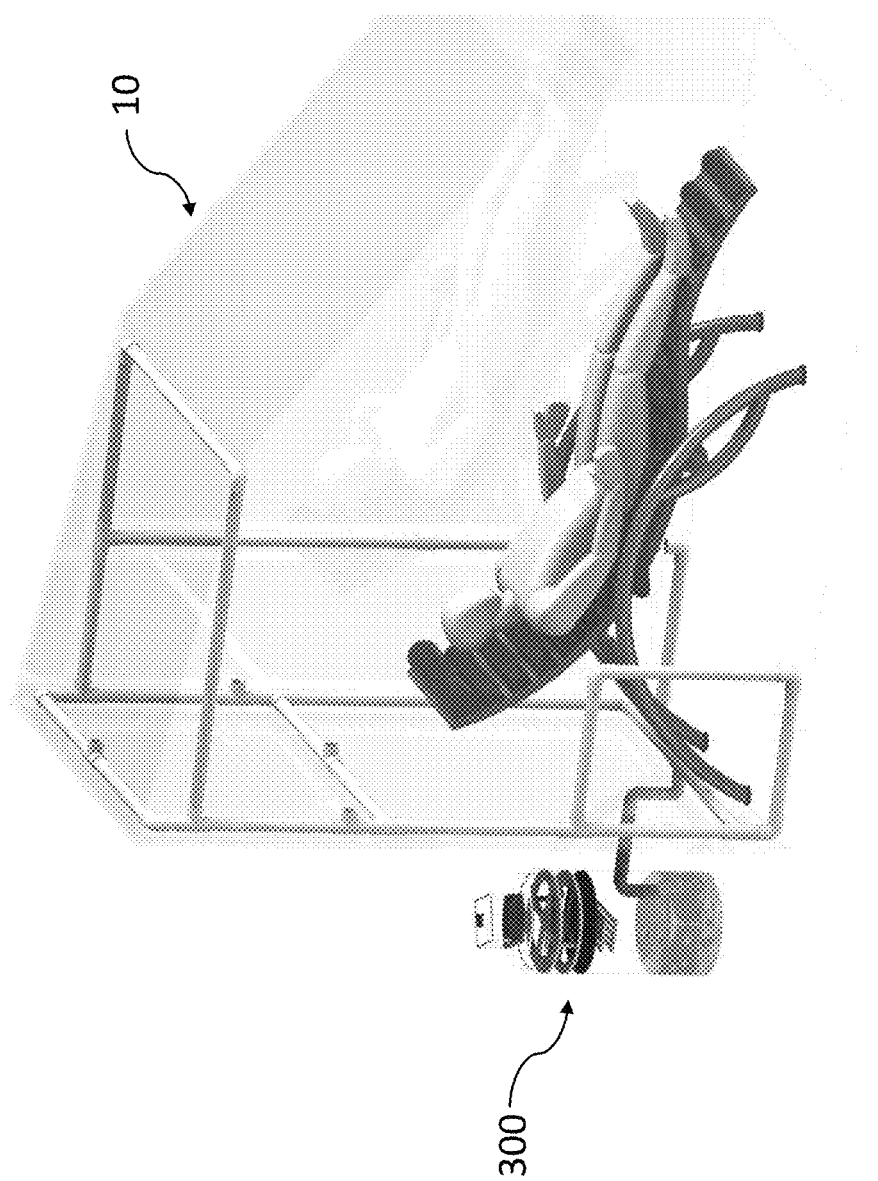
Figure 7A:
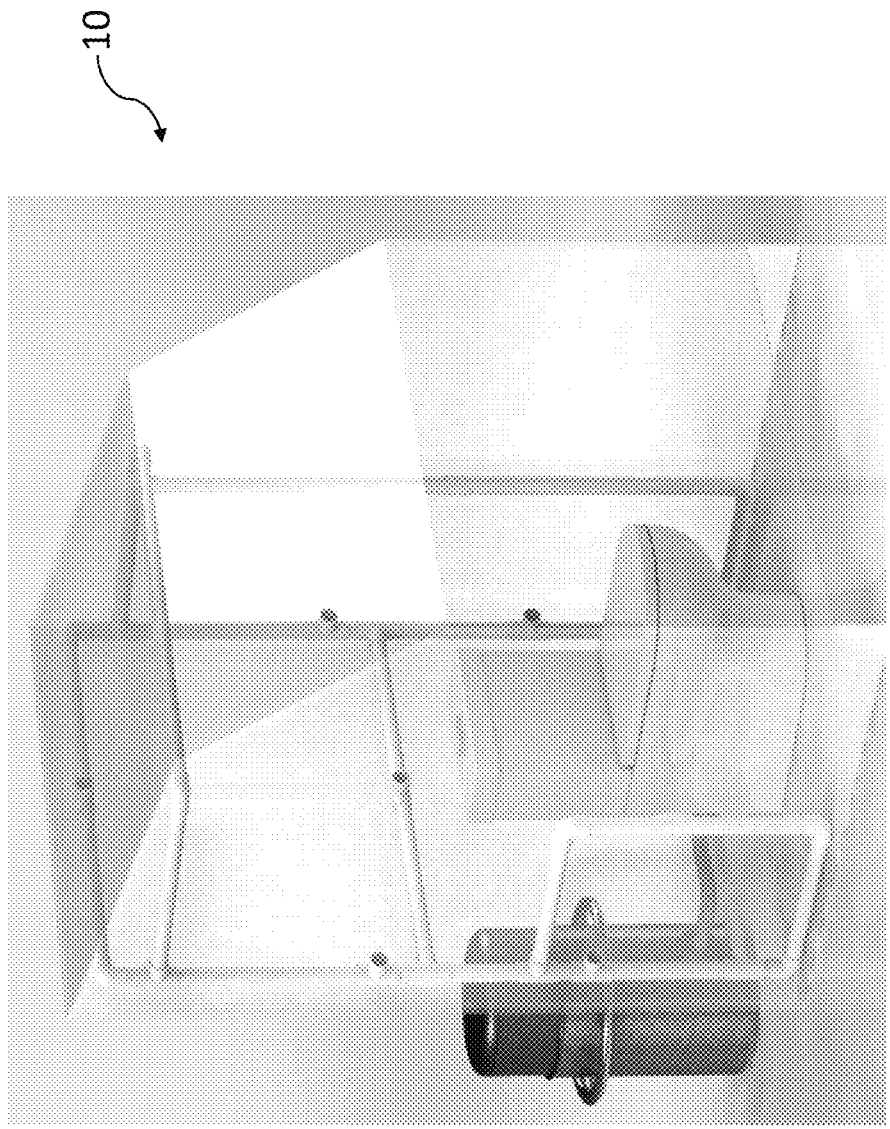
FIGS. 7A-7B show a vented enclosure system for a toilet including illustration of toilet droplet flow during a flush with ventilation.
Figure 7B:
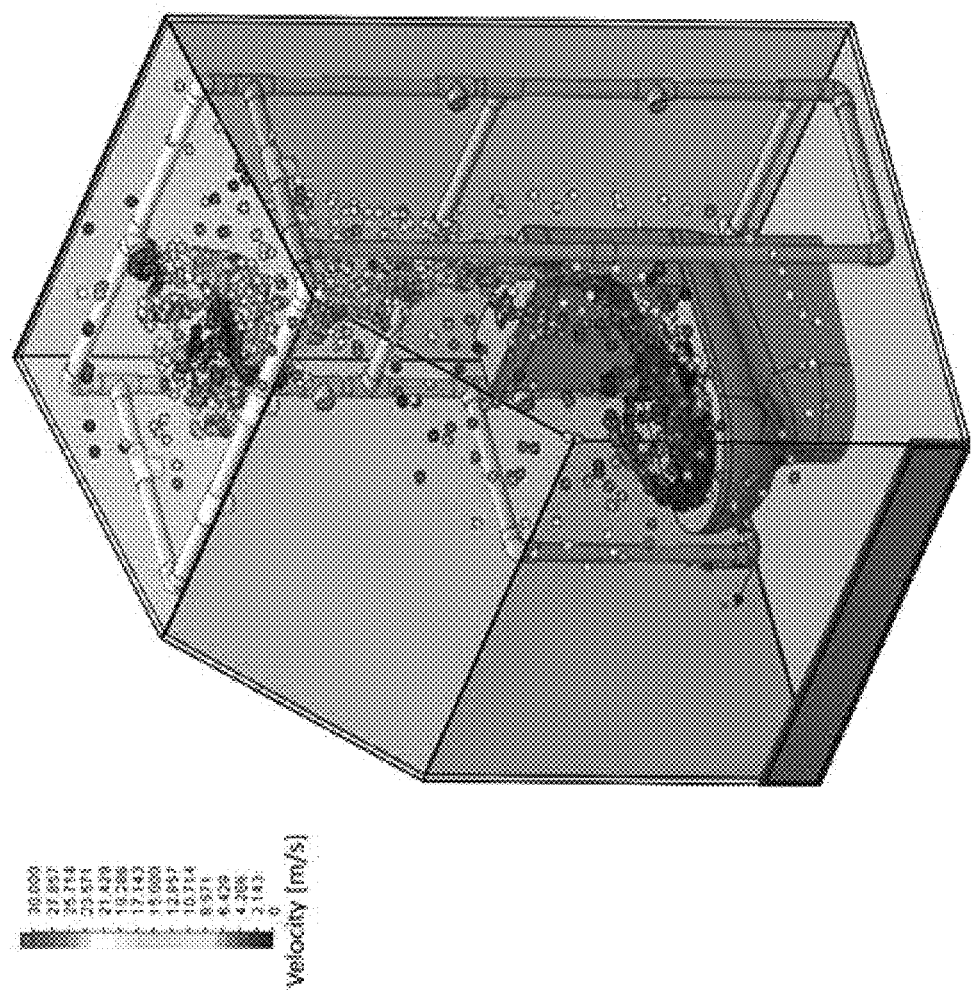
Figure 8A:
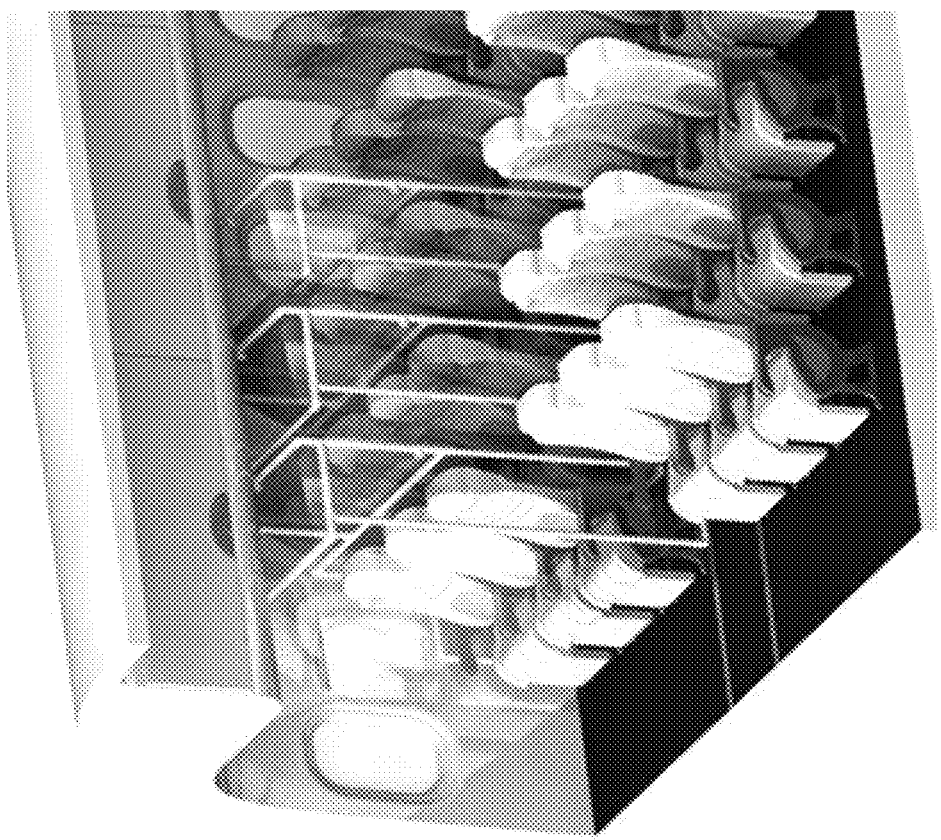
FIGS. 8A-8B depict use of ventilated enclosure systems on an airplane.
Figure 8B:
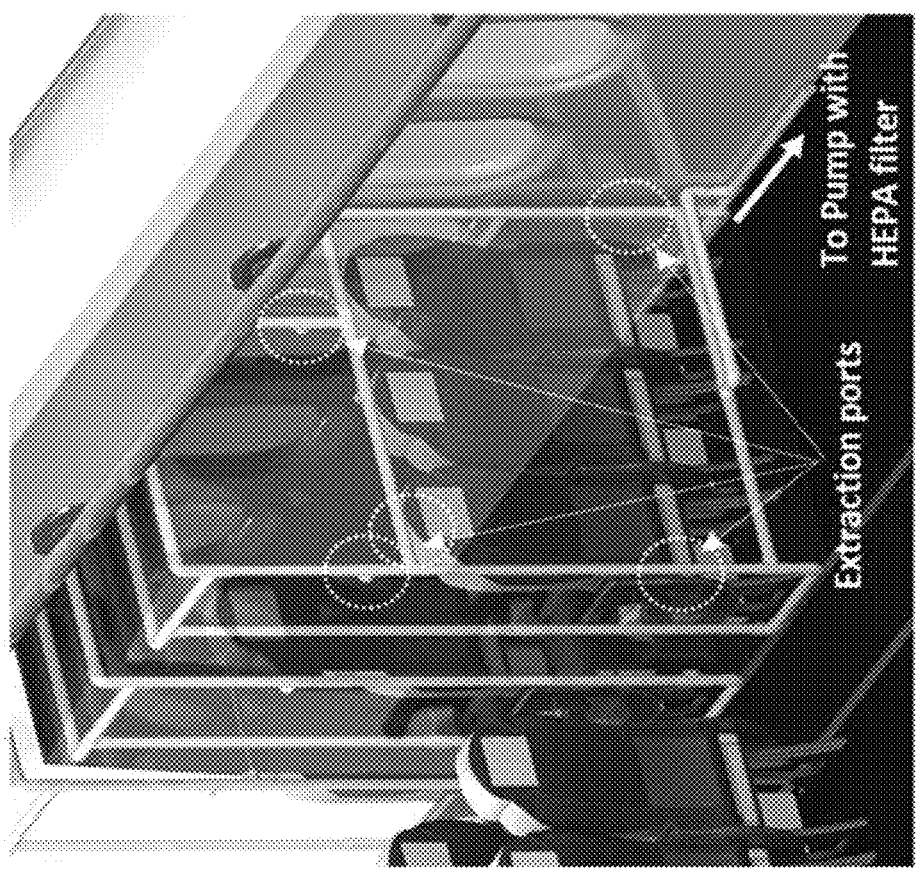

The enclosure of the present invention is partially enclosed through the transparent polymer sheet 20/120. For example, the partial enclosure may be used for suspected patients in hospital waiting rooms and clinics as shown in FIGS. 2, 3, and 4G. Alternatively, the vented enclosure may be designed for 1-1.5 m wide hospital beds (FIG. 3B). In yet another aspect, the enclosure may surround a toilet as shown in FIGS. 6A-6B and 7A-7B. Further, the system may be used on transit such as an airplane as shown in FIGS. 8A-8B. Fully enclosed systems may be used in places such as the ICU in the case of confirmed COVID-19 patients as shown in FIG. 3, or for toilets as shown in FIGS. 6-7 with the toilet lid itself being treated as a portion of the full enclosure. A partially enclosed system may be used that is not fully airtight and can be configured to allow air to enter through gaps, similar to a negative pressure room; that is, air from outside the enclosure is drawn through gaps in the portable vented enclosure system. The nature of airflow within the portable enclosures will change considerably for different enclosure designs, mainly depending on factors including size, geometry, location of extraction openings for air to enter the enclosure, location and configuration of air extraction and air ingress. For a given enclosure, the objective of ventilation differs depending upon whether it is for a confirmed patient or for a suspected patient.

The enclosure minimizes the exposure of healthy individuals, such as medical workers, to airborne contaminants emitted by confirmed or suspected COVID-19/other respiratory infectious disease patients or other sources (i.e., toilets). In all cases, the ventilation rate is sufficient to prevent leakage from the enclosure. For the partially enclosed system, a sufficiently high ventilation/extraction rate is set to ensure that a steady state concentration of contaminants resulting from a continuous source (e.g., an individual or toilet bowl), does not exceed a critical safe concentration around the enclosure system.

The transparent polymer sheet 20/120 may include an anti-viral coating to further enhance the quality/safety of the enclosure system, and scheduled biological experiments based on, e.g., *E. Coli* may be conducted to mimic a COVID-19 environment in order to optimize the system design, and to ensure that the system is may be applied to a particular environment. Microbial air quality and bacterial surface contamination will be monitored and quantified at different conditions and scenarios. It is expected that bacterial load in the air will be mainly affected by both the anti-viral coating and the ventilation system. As a result, an experimental investigation into bacterial load in the air using different coatings under different ventilation conditions will be paid particular attention. By coating the surface with antiviral materials, a number of advantages of protection are provided as compared with the regular cleaning: (1) the antiviral properties function over a long duration more effectively; and (2) the presence of 'dirty blind-spots' are minimized. In one embodiment, a layer of photocatalyst coating on enclosure surfaces capable of killing viruses in the presence of visible light may be used.

EXAMPLE

Performance of the Negative Pressure Enclosure System

Figure 9:
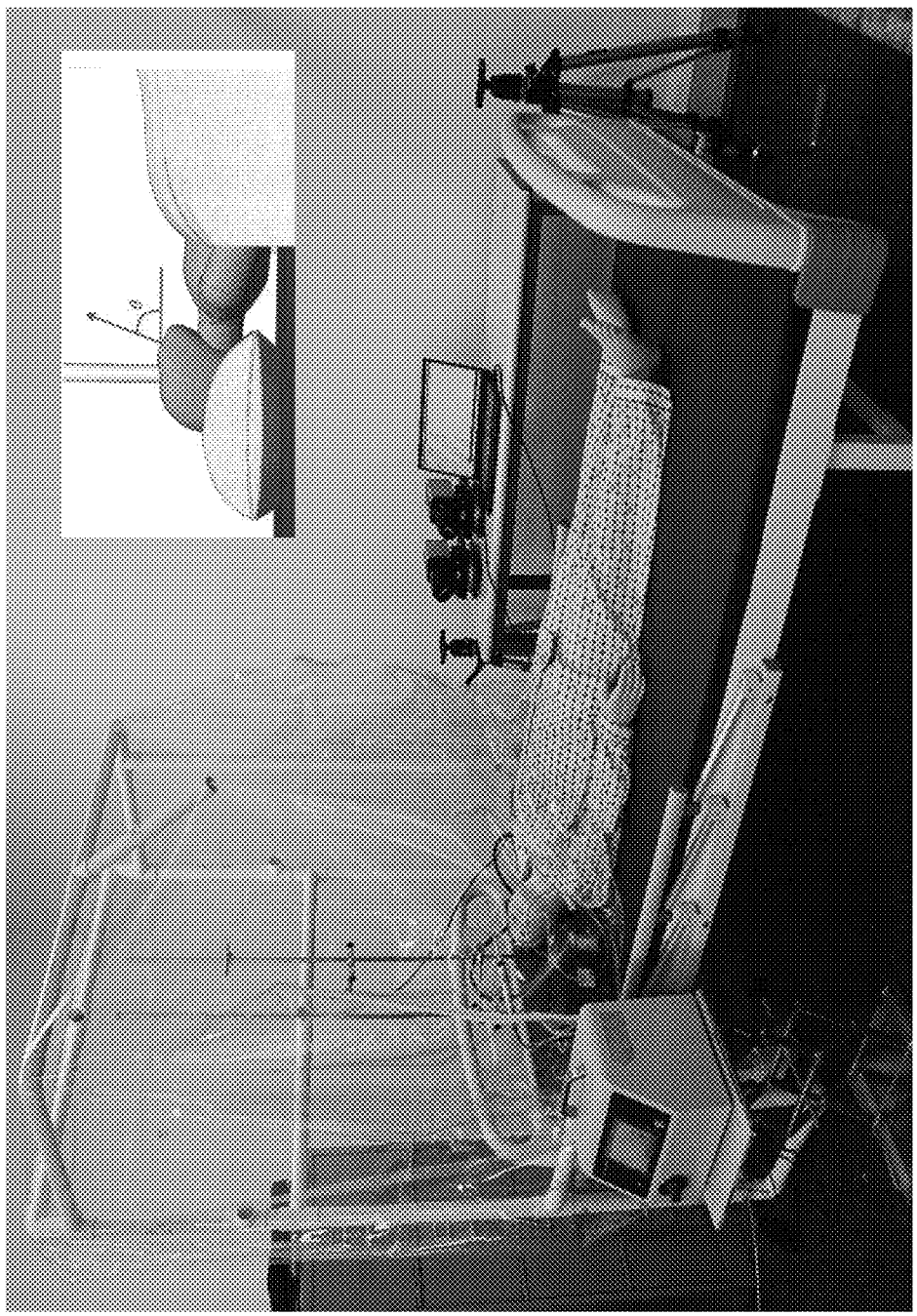
FIG. 9 depicts a prototype configuration for measurement of airflow in various scenarios (breathing, talking, coughing) in a ventilated system.
Figure 10B:
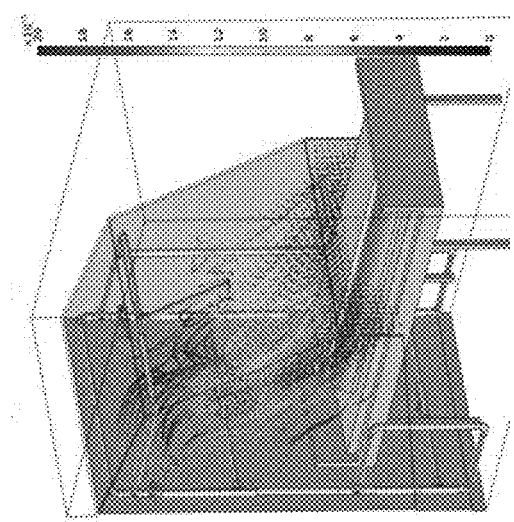
FIGS. 10A-10D depict aerosol removal performance of the prototype of FIG. 9.
Figure 10D:
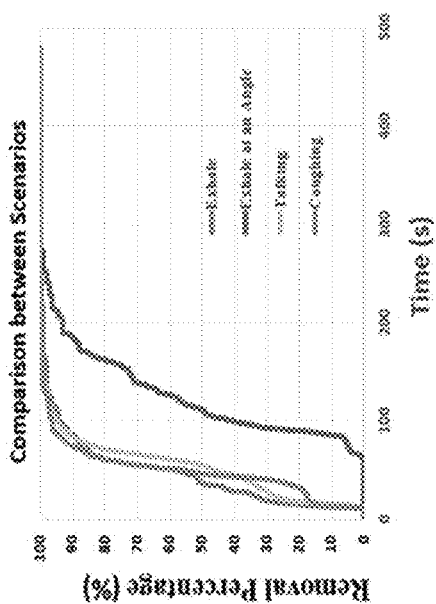
Figure 10A:
Figure 11B:
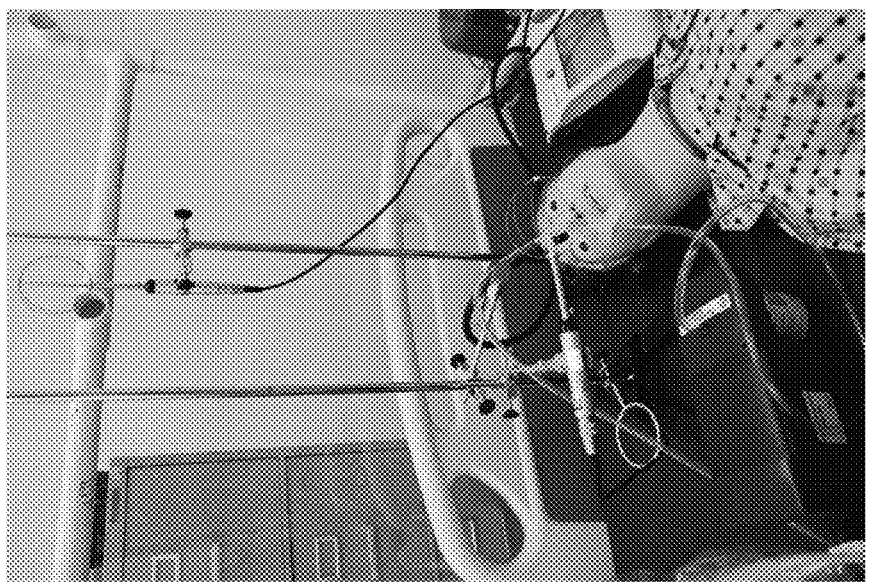
FIGS. 11A-11B show an experimental configuration with several particle counters used to measure aerosol concentration and a PIV system used to quantify airflow.
Figure 11A:
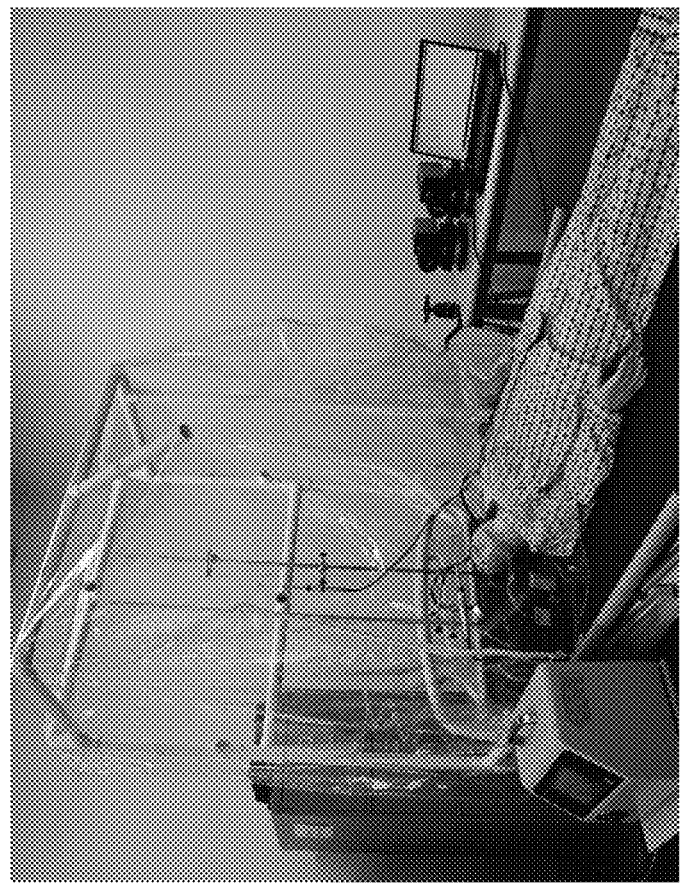

An embodiment of the portable vented enclosure system to house suspected or confirmed COVID-19 patients in hospitals is depicted as FIG. 2 and a working example for testing purposes shown in FIGS. 9 and 10A. The efficiency of the enclosure system is evaluated by conducting computational fluid dynamics (CFD), as shown in FIGS. 10B and 10D; these results demonstrate that the enclosure system has a remarkably high cleaning efficiency under various activities including exhalation, talking and coughing. For the experimental set-up (FIG. 10A), all 4 extraction ports are distributed above the patient's head, and this system is targeted for suspected COVID-19 patients. A relatively dilute aerosol/virus concentration is considered while determining the extraction rate/aerodynamics conditions. As FIGS. 11A-11B illustrates, the system uses several particle counters to measure aerosol concentration and a PIV system is used to quantify airflow. The results are as follows:

The system can achieve 87 air changes per hour (ACH) while the Centre for Disease Control and Prevention suggests a minimum ACH of 12.

Figure 10C:
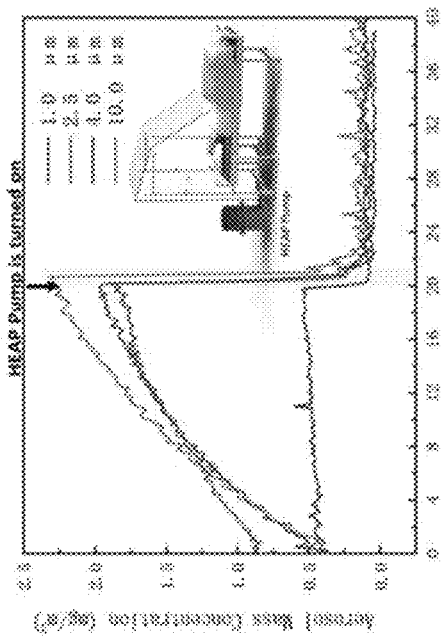

The working example demonstrates excellent performance. For the variation of aerosol concentration with respect to hood system usage: the aerosol concentration of different particle sizes in the hood sharply drops to close to 0 within 2 minutes after negative pressure is introduced (FIG. 10C), this is due to the strong negative pressure created inside the system.

Figures 12A, 12B, 12C:
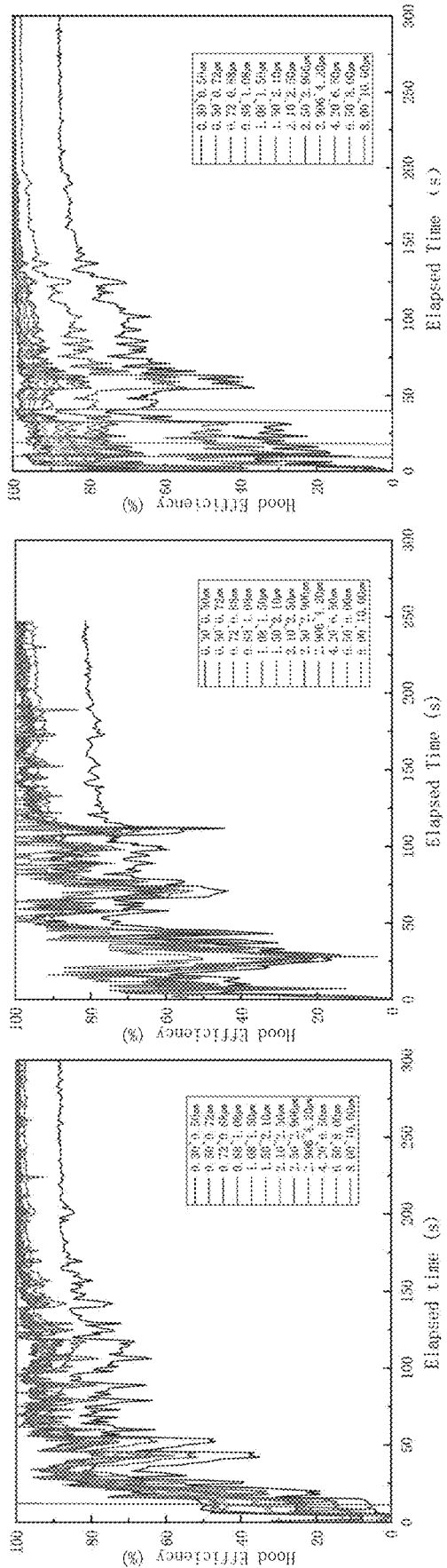
FIGS. 12A-12C demonstrate high removal efficiency using the systems of the present invention 97.13%~100% removal is demonstrated (negative pressure is introduced at t=0).

As shown in FIGS. 11A-11B, an Optical Particle Sizer spectrometer (TSI OPS Model 3330) is used along with a Scanning Mobility Particle Sizer spectrometer (TSI NanoScan SMPS Model 3910); FIGS. 12A-12C illustrate that aerosols in different initial orientations of contaminated air flow are very well removed at a high efficiency of 97.13%~100%.

Various scenarios (breathing, talking and coughing) may be studied to analyze their effect on the performance and different orientations (θ) of exhaled air flow can be examined (FIG. 9).

INDUSTRIAL APPLICABILITY enclosure is a platform for avoiding the risk of cross-infection in several important venues including: (1) Hospitals, in wards, ICU and waiting rooms; (2) airplanes; (3) trains; (4) toilets; (5) clinics/aging centres/health centres; (6) airports; (7) isolation centres; (8) makeshift hospitals. Besides, low base cost, low maintenance cost, low operation cost, long lifetime easy and fast assembling procedures, and environmentally friendly materials at the same time are very competitive and superior strengths.

Users include personal healthcare workers, hospitals, government sectors (for Hong Kong market: mainly Hospital Authority, Food and Environmental Hygiene Department, Airport Authority Hong Kong) and humanitarian aid groups.

The above channels are focused on the personal healthcare workers, hospitals, government sectors and humanitarian aid groups. All those industry product showcases, participation in tender and publication of academic journals are aimed to maximize the market exposure to customers of the professional field, as their supply selections are heavily based on the advice and reviews of trustworthy professional institutions via official channels.

For example, in Hong Kong, there are 43 public hospitals (including medical institutions), 12 private hospitals, 49 specialist outpatient clinics and 73 general outpatient clinics, and the Hospital Authority provides about 29,000 hospital beds and employs about 84,000 people (as at 31 Mar. 2020). Furthermore, according to the Legislative Council document, there are about 1,700 public and dry toilets in Hong Kong. Before the COVID-19 outbreak, Hong Kong International Airport (HKIA) handled 71.5 million passengers in 2019. All of these figures above illustrate the demand in Hong Kong, which indicate there is a huge market across the world. As of June 2021, more than 175 million people have tested positive for COVID-19, which also points to the large need for the system of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

Several embodiments of the present disclosure and features of details are briefly described above. The embodiments described in the present disclosure may be easily used as a basis for designing or modifying other processes and structures for realizing the same or similar objectives and/or obtaining the same or similar advantages introduced in the embodiments of the present disclosure. Such equivalent construction does not depart from the spirit and scope of the present disclosure, and various variations, replacements, and modifications can be made without departing from the spirit and scope of the present disclosure.

The invention claimed is:

1. A portable vented individual negative pressure enclosure system for extracting potentially contaminated air from an individual comprising:
   an adjustable assemblable and disassemblable frame structure configured to surround a bed, chair, or toilet;
   a vapor-impermeable flexible sheet extending over the frame structure;
   a multi-component air purification system comprising at least a water filtration-based air cleaner and a HEPA filter; and
   a plurality of extraction vents communicating with the frame structure or the vapor-impermeable flexible sheet and the air purification system;
   wherein the water filtration-based air cleaner includes a particle growth tube for growing the size of extracted aerosol particles to enable their collection in a water tank.

2. The portable vented individual negative pressure enclosure system according to claim 1, further comprising a UVC sterilizer.

3. The portable vented individual negative pressure enclosure system according to claim 1, further comprising a pump.

4. The portable vented individual negative pressure enclosure system according to claim 1, wherein the adjustable assemblable and disassemblable frame structure includes polymer pipes.

5. The portable vented individual negative pressure enclosure system according to claim 1, wherein the flexible vapor-impermeable sheet is a transparent polymeric sheet.

6. The portable vented individual negative pressure enclosure system according to claim 5, wherein the transparent polymeric sheet includes an anti-viral coating.

7. The portable vented individual negative pressure enclosure system according to claim 3, wherein the pump has an airflow rate of at least approximately 150 m$^3$/hour.

* * * * *